Figure 1:
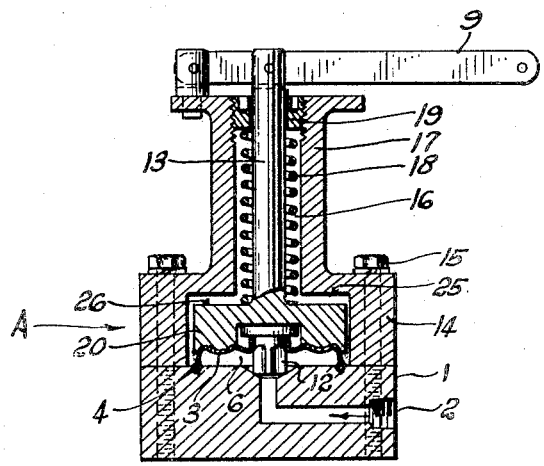

Sept. 1, 1953 — C. H. FLUBACKER — 2,650,618
DIAPHRAGM FOR PRESSURE REGULATORS
Filed Aug. 6, 1948

INVENTOR.
Charles H. Flubacker
BY Theiss, Olson & Mecklenburger
Att'ys

Patented Sept. 1, 1953

2,650,618

UNITED STATES PATENT OFFICE 2,650,618

DIAPHRAGM FOR PRESSURE REGULATORS

Charles H. Flubacker, Chicago, Ill., assignor to Cook Electric Company, Chicago, Ill., a corporation of Illinois Application August 6, 1948, Serial No. 42,916

8 Claims. (Cl. 137—789)

This invention relates to a pressure sensitive device of the type employing a flexible diaphragm and has for an object the provision of a simple, light weight, inexpensive and sturdy device having great accuracy at low pressures and able to withstand high pressure surges without injury to its parts.

According to the invention, the device includes a pressure loading piston in intimate supporting contact at all times with the greater portion of the flexible diaphragm and in particular when the device is subjected to excessive pressure surges. A feature of the invention is the positive limiting of movement of the pressure loading piston. This retains the pressure loading piston in supporting relationship to the diaphragm when the device is subjected to excessive pressure surges and prevents the distortion of the diaphragm. Seating of this pressure loading piston at maximum operating pressure removes excessive pressure load on the operating spring and permits use of a more sensitive operating spring, particularly at low pressure. The spring rate of the spring will not be disturbed because after the operating movement of the diaphragm, the continued pressure load is against the housing and not against the spring.

This invention, together with further objects and advantages thereof, will best be understood by reference to the following description taken in connection with the accompanying drawing, and its scope will be pointed out in the appended claims.

Figure 2:
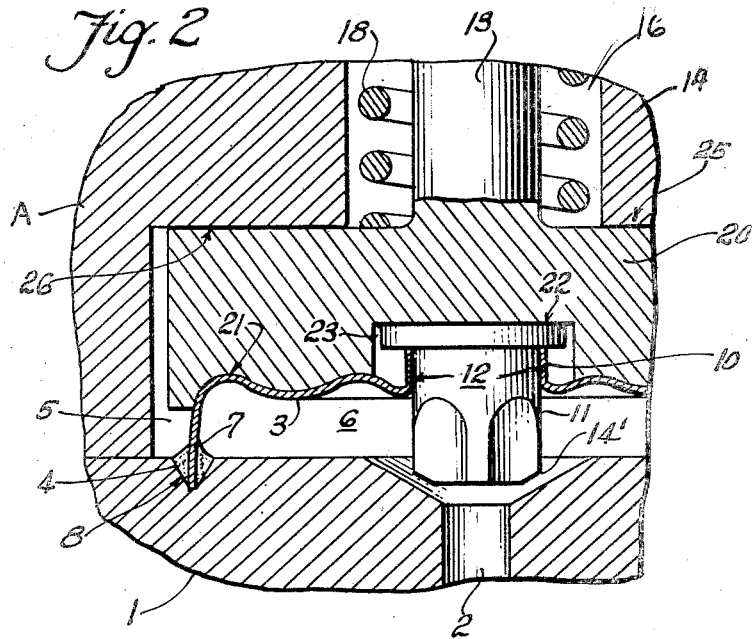

In the drawing:

Figure 1 is a view partly in cross section and partly in elevation of a pressure sensitive device incorporating the features of my invention, and Fig. 2 is an enlarged view of a portion of the device shown in Fig. 1.

Referring now more specifically to the drawing, housing A is divided into two parts, the lower part 1 having a fluid passage 2 therein and the upper part 14 having a chamber 5 therein. A diaphragm 3 is disposed in chamber 5 and is anchored at its outer periphery by a flange and gutter joint 8 formed by a circular groove 4 in the lower member 1 and an outer flange 7 of diaphragm 3. Solder may be puddled in gutter 4 and caused to flow about both sides of flange 7 to form a joint devoid of air pockets and capable of resisting rupture over a wide range of operating pressures and conditions. If so desired, joint 8 may be formed by brazing, welding or the like.

Above the diaphragm 3 is a pressure loading piston 20 adapted to move rod 13 to operate lever 9 when the pressure in chamber 6 increases to a predetermined value. It will be understood that lever 9 is intended to be connected to the device to be operated according to the pressure in chamber 6.

In the particular embodiment shown in the drawing, diaphragm 3 has an opening at its center and an inner peripheral flange 10. Flange 10 embraces the shank of valve body 11 and is attached in a manner to form a seal at 12 for chamber 6. The connection between flange 10 and valve body 11 may be made either by soldering, brazing or welding. Upper body member 14 may be attached to lower body member 1 by any suitable means, such as by bolts 15, and have a spring chamber 16 in an upper neck portion 17. The responsive movement of piston 20 and lever 9 produced by pressure in chamber 6 is controlled by a spring 18 in chamber 16. Spring 18 at its upper end abuts plug 19 adjustably inserted in the upper end of chamber 16. At its lower end, spring 18 exerts pressure against pressure loading piston 20 carried by rod 13, the plug 19 providing for adjustment of the tension spring 18 exerts against piston 20.

Diaphragm 3 is, of course, responsive to the pressure in chamber 6 and reacts to this pressure according to the pressure load exerted by spring 18. In order to protect diaphragm 3 and spring 18 against destructive effects of excessive pressure surges or sustained high pressures beyond the operating pressure range intended for the unit and capable of affecting the spring rate of either diaphragm 3 or spring 18 or distorting the same, diaphragm 3 is seated or nested against the underside 21 of pressure loading piston 20 by forming this underside 21 to correspond in curvature to the curvature of diaphragm 3, and the movement of this piston 20 is limited to cause it to remove the pressure load from the diaphragm and spring after the diaphragm has responded to the extreme upper limit of the operating pressure range. As will be observed in Fig. 2, the underface 21 of piston 20 supportingly embraces a larger part of the surface of the diaphragm 3 which responds to pressure changes while but a small part is unsupported in this manner. This small part is mainly the outer and inner flanges 7 and 10 which will not be subject to any straining if the pressure unduly rises in chamber 6. Valve member 11 is provided with a head 22 which is designed to be disposed in a recess 23 in piston 20, the recess 23 being slightly larger than head 22. Valve member 11 will, therefore, act to hold diaphragm 3 in continued surface contact with underface 21 of piston 20 throughout the entire range of movement of diaphragm 3.

The upper movement of piston 20 is restricted by a shoulder 25 formed in the specific embodiment herein by the reduction of upper body member 14 to provide neck 17 in which spring chamber 16 is formed. Shoulder 25 provides a substantial abutment of relatively large area for the upper face 26 of piston 20 and assures a positive stop for this piston in its upward movement. It will be observed that chamber 5 is slightly larger than this piston 20 so that in effect piston 20 nests within the chamber but is permitted adequate movement to allow for operation throughout a desired pressure range. The downward movement of piston 20 is limited by the lower end 14' of valve body 11 seating upon part 1 of the housing directly over the passage 2.

In certain fields of use, a pressure responsive unit is often required to operate through a given range of delicately adjustable low pressures. To guard against the damaging effects of pressure surges of greater magnitude which are apt to occur in many fluid lines and which will frequently destroy the accuracy of the unit, diaphragm 3 herein shown is arranged normally to be embraced by face 21 of piston 20, and the upper face 26 of this piston is positioned with respect to shoulder 25 so that upper face 26 will be brought to bear and, of course, rest against shoulder 25 before excessive pressure can damage any part of the structure. Moreover, upper face 26 will abut against shoulder 25 before the spring rate of spring 18 can be disturbed. Hence, spring 18 can be of a more sensitive type and can be relied upon to perform accurately its duty at low pressures throughout a long period of time without the danger of being strained beyond its elastic limit and its spring rate thus changed. Also, it is impossible for diaphragm 3 to be likewise distorted and its spring rate disturbed.

The arrangement disclosed provides, therefore, a low operating pressure unit of exceedingly great accuracy capable of use in lines where high pressures or surges are apt to occur. Also, the operating range can be made greater than arrangements heretofore produced.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a pressure controlled device, a pressure responsive metal diaphragm having inner and outer peripheries, fluid retaining means, said diaphragm having its outer periphery sealed to one wall of said fluid retaining means, there being a pressure chamber between said fluid retaining means and said diaphragm and a connection leading to said chamber from a source of fluid pressure, a pressure loading member having a face contacting the outer face of said diaphragm and adapted for movement by said diaphragm when said diaphragm is flexed by the pressure of the fluid in said pressure chamber, means for limiting such movement of said pressure loading member, said pressure loading member having a pocket therein, and a member to which the inner diaphragm periphery is sealed extending into said pocket.

2. In a pressure controlled device, a pressure responsive metal diaphragm having inner and outer peripheries, fluid retaining means, said diaphragm having its outer periphery sealed to one wall of said fluid retaining means, a pressure loading member having a face contacting the outer face of said diaphragm and adapted for movement by said diaphragm when said diaphragm is flexed, means for limiting such movement of said pressure loading member, and a member separate and independent of the pressure loading member and to which the inner diaphragm periphery is sealed, said last mentioned member riding with said pressure loading member as it is moved by said diaphragm.

3. In a pressure controlled device, a pressure responsive metal diaphragm having inner and outer peripheries, a fluid retaining means, there being a pressure chamber between said fluid retaining means and said diaphragm and a connection leading to said chamber from a source of fluid pressure, said diaphragm being adapted to flex under the influence of pressure of the fluid within said pressure chamber, a pressure loading member having a face embracingly contacting said diaphragm whereby said face is in intimate supporting surface contact with the outer face of said diaphragm, and a centrally positioned member movable with said pressure loading member, said centrally positioned member being separate and independent of the pressure loading member and having said inner diaphragm periphery sealed thereto so that said face of said pressure loading member will continue in intimate supporting surface contact with the outer face of said diaphragm throughout the entire movement of said diaphragm.

4. In a pressure controlled device, a pressure responsive metal diaphragm having inner and outer peripheries, fluid retaining means, there being a pressure chamber between said diaphragm and said fluid retaining means and a connection leading to said chamber from a source of fluid pressure, said diaphragm being adapted to flex under the influence of pressure of the fluid within said pressure chamber, a pressure loading member having a face embracingly contacting said diaphragm whereby said face is in intimate surface contact with the outer face of said diaphragm, spring means for urging said pressure loading member against said diaphragm, and a member separate and independent of the pressure loading member but movable with said pressure loading member and diaphragm, said member having said inner diaphragm periphery sealed thereto so that said face of said pressure loading member will continue in intimate supporting surface contact with the outer face of said diaphragm throughout the entire movement of said diaphragm.

5. In a pressure controlled device, a pressure responsive metal diaphragm having inner and outer peripheries, fluid retaining means, there being a pressure chamber between said diaphragm and said retaining means and a connection leading to said chamber from a source of fluid pressure, said diaphragm being adapted to flex under the influence of pressure of the fluid within said pressure chamber, a pressure loading member having a face embracingly contacting said diaphragm whereby said face is in intimate surface contact with the outer face of said diaphragm, said pressure loading member being adapted for movement in response to the flexing of said diaphragm, means for limiting such movement of said pressure loading member, a spring urging said pressure loading member against said diaphragm, and a member separate and independent of the pressure loading member and movable with said diaphragm, said last member having said inner diaphragm periphery sealed thereto so that said face of said pressure loading member will remain in intimate surface contact with the outer face of said diaphragm throughout the entire movement of said diaphragm.

6. In a pressure controlled device, a pressure responsive metal diaphragm having outwardly extending flanges at the inner and outer peripheries with curved portions connecting the same with an intermediate flexible portion, a pressure loading member having a face pressed in surface contact against said intermediate flexible portion, fluid retaining means, said outer peripheral flange being sealed to retaining means so that said diaphragm forms one wall of a closed pressure chamber between itself and said retaining means, there being a connection leading to said pressure chamber from a source of fluid pressure, and a member separate and independent of the pressure loading member and to which said inner peripheral flange is sealed, said last member being movable with said pressure loading member and keeping said diaphragm in surface contact with the face of said pressure loading member throughout the movement of said pressure loading member.

7. In a pressure controlled device, a pressure responsive metal diaphragm having oppositely turned upstanding flanges at the outer and inner peripheries and curved portions connecting said flanges with an intermediate flexible portion, fluid retaining means, the outer diaphragm flange being joined to a part of said retaining means so that a pressure chamber is formed between said diaphragm and said retaining means, there being a connection leading to said pressure chamber and a source of fluid pressure, a pressure loading member having a face in surface contact with said flexible portion of said diaphragm and movable outwardly when said flexible portion is flexed by the pressure of the fluid in said pressure chamber, means for positively limiting the outward movement of said pressure loading member, and a member to which said inner diaphragm flange is joined, said last member being movable with said diaphragm when it is flexed outwardly and keeping the entire area of said flexible portion in surface contact with said face of said pressure loading member.

8. In a pressure controlled device, a pressure responsive metal diaphragm having oppositely turned upstanding flanges at the outer and inner peripheries and curved portions connecting said flanges with an intermediate flexible portion, fluid retaining means, a pressure loading member, said diaphragm and said pressure loading member being disposed in said retaining means, the outer diaphragm flange being joined to a wall of said retaining means, a member also disposed within said retaining means to which the inner diaphragm flange is joined to form a closed pressure chamber, said intermediate flexible portion of said diaphragm having surface engagement with said pressure loading member, and means for limiting the movement of said pressure loading member when said flexible portion is flexed by the pressure of the fluid in said pressure chamber, said member disposed within said retaining means being movable to keep said flexible portion in constant surface contact with said pressure loading member throughout its entire movement.

CHARLES H. FLUBACKER.

References Cited in the file of this patent

UNITED STATES PATENTS

| Number | Name | Date |
|---|---|---|
| 762,767 | Scott | June 14, 1904 |
| 1,034,323 | Tanner | July 30, 1912 |
| 1,062,300 | Pierce | May 20, 1913 |
| 1,712,657 | Frankenberg | May 14, 1929 |
| 1,999,675 | White | Apr. 30, 1935 |
| 2,178,490 | Nielsen | Oct. 31, 1939 |
| 2,297,678 | Allen | Oct. 6, 1942 |
| 2,433,221 | Huber | Dec. 23, 1947 |